United States Patent
Chiappetta et al.

(10) Patent No.: US 6,522,798 B2
(45) Date of Patent: Feb. 18, 2003

(54) MODULAR OPTOELECTRIC ARRAY TRANSDUCER

(75) Inventors: Mark Christopher Chiappetta, Hatfield, PA (US); Steven Carl Cahill, Philadelphia, PA (US)

(73) Assignee: Stratalynx Corporation, Blue Bell, PA (US)

( * ) Notice: Subject to any disclaimer, the term of this patent is extended or adjusted under 35 U.S.C. 154(b) by 223 days.

(21) Appl. No.: 09/772,090

(22) Filed: Jan. 27, 2001

(65) Prior Publication Data

US 2003/0007717 A1 Jan. 9, 2003

(51) Int. Cl.$^7$ .............................. G02B 6/12; G02B 6/43
(52) U.S. Cl. .......................................... 385/14; 385/89
(58) Field of Search ................................ 385/14, 88–92

(56) References Cited

U.S. PATENT DOCUMENTS 6,318,909 B1 * 11/2001 Giboney et al. .............. 385/90

OTHER PUBLICATIONS

No date Available, 16–page brochure from Infeon Technologies.
May 2000, Full–Page Advert, Infeon Technologies.
May 1999, Full–Page Advert NGK/Optobahn.
Aug. 1999, Sheet w/Two Quarter–Page Ads: Ericssohn.
1998, Six–Page Article by Kellzi.
No Date available, Four–page Brochure "nLIGHTEN . . . ".
Dec. 1999, 2–page oversize Ad "Soon to be Available" Gore.
Jul. 2000, 4–Page Article by Welch Gore.
No Date Available, 1–Page Dimensions "Gore".
1988, 6–Page article by Karstensen et al.

* cited by examiner

*Primary Examiner*—Hemang Sanghavi
*Assistant Examiner*—Omar Rojas
(74) *Attorney, Agent, or Firm*—Duane Morris LLP

(57) ABSTRACT

An optoelectric transducer module is adapted for mounting at or near the edge of a printed circuit board, for transducing between optical signals flowing in an MT ferrule and electrical signals on the printed circuit board. The transduction may be in either direction. The module uses HDI circuit techniques in conjunction with solid-state optoelectric arrays for reliability and low cost. According to an aspect of the invention, the module is convertible to adapt to any of a number of connector types which use the MT-style ferrule. Thus, the type of connector does not need to be known a priori, but the basic module may be mounted on the printed circuit board, and later fitted with a connector receptacle corresponding to the desired one.

4 Claims, 8 Drawing Sheets

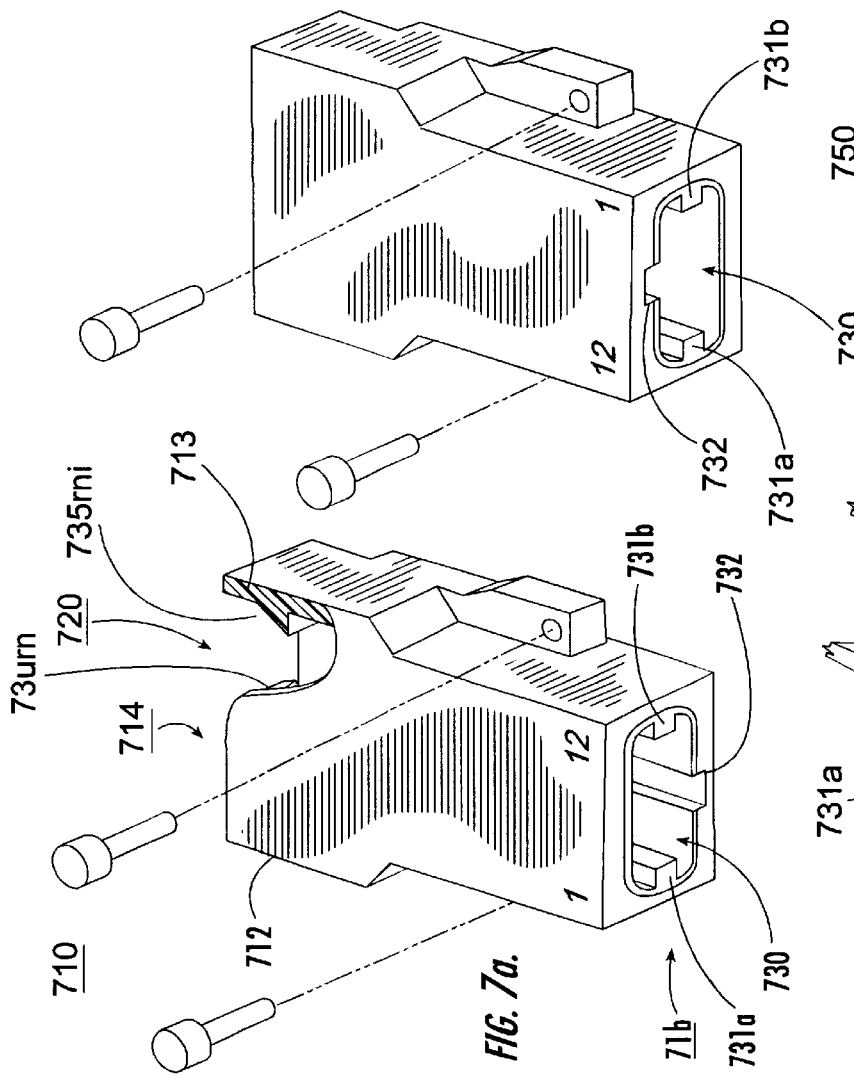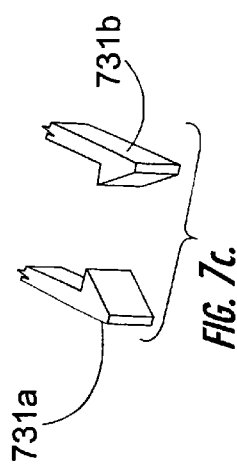

MODULAR OPTOELECTRIC ARRAY TRANSDUCER

FIELD OF THE INVENTION

This invention relates to optoelectric transducers, and more particularly to arrays of optoelectric transducers which may be fabricated in modular form for mounting on printed-circuit boards.

BACKGROUND OF THE INVENTION

The need for bandwidth in communications systems has become acute due to the change of interpersonal communications from low-bandwidth audio to large-bandwidth video, and also by the increased high-speed traffic in large blocks of data, as for example in the downloading of audio and video files. Even overland microwave communications systems, which have bandwidths of tens and hundreds of megahertz (MHz), and which were in the past sufficient to handle hundreds or thousands of telephone calls are now obsolete, because of the large number of users of broadband communications. It is widely expected that optical communications paths will become the preferred medium for wideband communications in the future, because of the relatively low cost of optical fibers, their small size, which allows many paths to occupy a small space, and because of the potentially great bandwidth they can provide.

At present, most signal processing is performed by electronic devices, and very little processing is performed optically. Consequently, each location at which broadband signals are handled has one or more electronic equipments such as a computer or digital processor. Most often, these are assemblies including one or more printed-circuit boards, on which electrically conductive traces are defined by processes known generally as "printing," which provide reliable and repeatable formation of exceedingly minute and complex electrical circuits between or among various electrical devices, including digital processors of various sorts, but which may also include analog processing devices.

In the past, the designer or manufacturer of a printed-circuit board or electrical equipment which required an interface or interconnection to an optical signal path designed his own interface to the optical fiber, with the result that a communication equipment would sometimes have a plurality of optical fiber "pigtails" to which other optical fibers could be connected. Such equipments are still in widespread use. The requirement for handling plural pigtails of optical fiber associated with a piece of equipment led to the design and adoption of "ribbons" of side-by-side optical fibers, which reduced the need for routing individual optical fibers by allowing a single ribbon cable to be routed. There was still a need for separating the optical fibers of the ribbon cable in order to make the connections of each optical fiber to its transducer, so the routing problem was not fully solved. An "MT ferrule" was designed by Nippon Telegraph and Telephone (NTT), which essentially consisted of a block encapsulating the end of an optical ribbon, polished and keyed to a pair of keying apertures into which keying pins could be inserted. This ferrule was found to be useful, as it eliminated the need to splay the fibers of the ribbon one from the other in order to make connection of one optical fiber ribbon to another.

Improved modular optoelectric transducers are desired.

SUMMARY OF THE INVENTION

A modular transducer according to the invention is intended for mounting onto an underlying printed-circuit board, for transducing between optical signals propagating through an MT ferrule and electrical signals. The modular transducer comprises an optoelectronic or optoelectric transducer solid-state device or integrated circuit including a planar optical interface surface and a plurality of optoelectric transducer elements arranged in a line array along an array axis with a pitch of 0.250 mm. The optoelectric transducer integrated circuit also includes at least one individual electrical connection for each of the optoelectric transducer elements and one electrical connection common to all of the optoelectric transducer elements. At least the one individual electrical connection for each of the optoelectric transducer elements is located on the planar optical interface surface. A heat spreading substrate which at least thermally conductive is included. The heat spreading substrate defines a front surface, which defines a planar portion and at least one depressed portion in which the optoelectric transducer integrated circuit lies, with the planar portion of the front surface of the heat spreading substrate substantially coplanar with the planar optical interface surface. The heat spreading substrate also defines a rear surface substantially parallel with the planar portion of the front surface. A transparent film extends over the planar optical interface circuit and at least a portion of the front surface of the heat spreading substrate. The transparent film bears electrically conductive circuit traces connected to the electrical connections of the optoelectric transducer elements. First and second alignment pins having diameters of 0.698 mm extend substantially perpendicularly from the planar portion of the front surface of the heat spreading substrate at locations lying substantially on the array axis at distances of 2.3 mm from the center of the line array.

The alignment pins extend through the transparent film if the transparent film overlies the intended or desired pin locations. A heat sink includes substantially mutually orthogonal first and second planar surfaces. At least a portion of the first planar surface of the heat sink is thermally coupled to the rear surface of the heat spreading substrate for heat transfer therebetween. An interface printed circuit includes a dielectric sheet defining first and second broad surfaces. The dielectric sheet is physically supported, at least in part, by the second surface of the heat sink. The interface printed circuit further includes electrically conductive circuit traces having electrical contact or coupling to at least some of the electrically conductive traces borne by the transparent film. The interface printed circuit further includes electrically conductive bond pads connecting to at least some of the electrically conductive traces of the interface printed circuit. The electrically conductive bond pads are generally planar connecting surfaces physically supported by the interface printed circuit dielectric sheet. The electrically conductive bond pads are accessible on the second broad surface of the dielectric sheet.

In one embodiment of the invention, the modular transducer further includes a protruding element projecting from the second side of the dielectric sheet, for engaging with a corresponding aperture of the underlying printed circuit for at least registering the bond pads with corresponding pads of the underlying printed circuit board.

In another avatar of the invention, the modular transducer further comprises an optoelectric driver integrated circuit including an electrical connection surface, the optoelectric driver integrated circuit being supported by the heat spreading substrate with the electrical connection surface coplanar with the planar portion of the front surface of the heat spreading substrate. At least some electrical connections of the electrical connection surface of the optoelectric driver integrated circuit are electrically connected to electrically conductive traces borne by the transparent film.

In a particularly advantageous manifestation of the invention, the modular transducer further includes an optical snout capable of accepting one of MTP, MPO, and MPX connector interfaces containing a MT ferrule, and optically mating the MT ferrule to the optoelectric transducer integrated circuit when the registration apertures of the MT ferrule are mated to the first and second alignment pins.

BRIEF DESCRIPTION OF THE DRAWINGS

FIG. 7a is a simplified perspective or isometric view, partially cut away to reveal interior details, of an adapter from the structure of FIG. 2 to be compatible with MPO and MTP connectors, FIG. 7b is a simplified perspective or isometric view of a variant 750 of the arrangement of the adapter 710 of FIG. 7a, and FIG. 7c illustrates details of portions of the adapters of FIGS. 7a and 7b;

DESCRIPTION OF THE INVENTION

Figure 1:
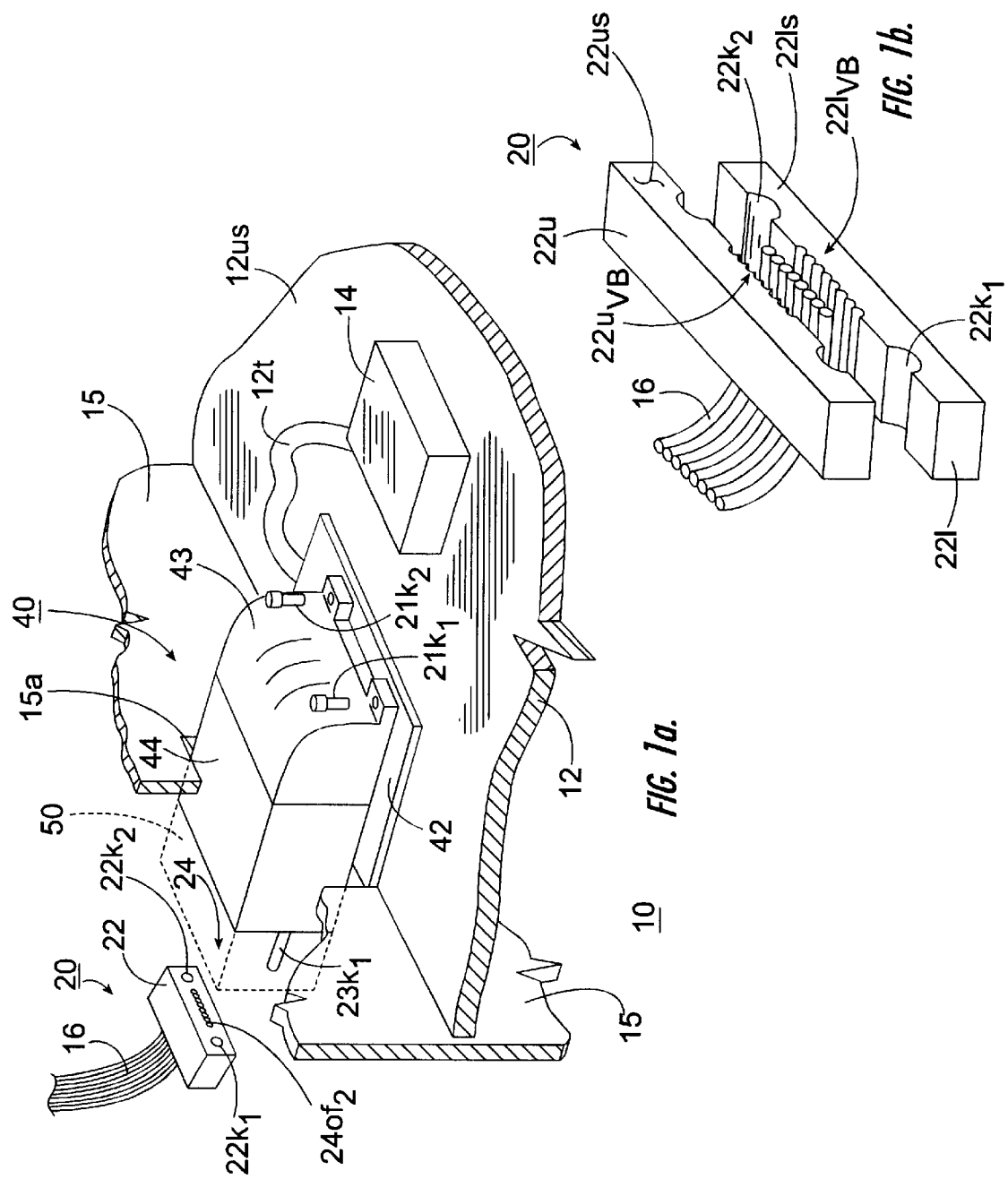
FIG. 1a is a simplified illustration in perspective or isometric view of a portion of a connector arrangement including a heat sink and an HDI substrate, for interconnecting a printed-circuit electrical or electronics board with a multiple-optical-fiber light path.
FIG. 1b is a simplified, exploded view of an MT-type optical ferrule or connector.

In FIG. 1a, an electrooptic arrangement 10 includes a portion of a printed-circuit (PC) board 12 of any type, fitted with electronics equipment illustrated as a block 14. Printed-circuit board 12 and its equipment 14 may be housed within a housing or cabinet having walls which are cut away to illustrate the interior. The nature of the electronics equipment is not relevant to the invention, but it may include plural sources or sinks of energy or signal, analog or digital processing, or the like. In such arrangements, it may be desirable to provide interconnectivity of PC board to another location or equipment by means of optical fibers. In FIG. 1a, the optical fiber signal path is illustrated as a ribbon 16 containing 12 optical fibers coupled to an MT optical ferrule designated generally as 20. Ferrule 20 includes a body 22, first and second keying apertures 22k1 and 22k2, and also includes a line array 24 of twelve optical apertures, one of which is designated 24 of 2. A particularly useful such ferrule is the MT ferrule, licensed by NTT for manufacture by USCONEC Ltd., located at 915 Tate Blvd. SE, Suite 154, Hickory N.C. 28602.

An optical array module designated generally as 40 in FIG. 1a provides an interface between the electrical signals flowing on electrically conductive paths or traces, one of which is illustrated as 12t in FIG. 1a, "printed" or otherwise formed on the upper, lower, or possibly intermediate layers of the printed circuit board 12. Since optical array module 40 makes optical coupling, contact or connection to multiple optical fibers within ribbon 16, it may in principle act as an optical transmitter as to some of the optical fibers, and an optical receiver as to others. In this context, an optical transmitter may be viewed as a transducer for one-way transduction between electrical or electronic signals and optical signals, while an optical receiver may be viewed as a one-way transducer for receiving optical signals over a fiber and generating an electrical signal in response thereto. In some cases, it may be desirable to have the optical array module 40 include only optical transmitters, and in other cases to include only optical receivers.

Optical array module 40 of FIG. 1a includes a portion 42 which is attached to the printed circuit board 12 for making physical and electrical connections thereto, and also includes a "heat sink" portion 43, which as known to those skilled in the art does not sink or dispose of heat, but rather provides a low-thermal-resistance path by which heat can flow to the environment without raising the temperature of the heat-sunk structures above a desired level. Optical array module 40 also includes a further portion illustrated as a block 44, which abuts the heat sink 43 for making thermal contact therewith, and which projects through an aperture 15a in housing wall 15. Portion 44 of the optical array module 40 contains the optical transducers which generate light signals in response to electrical signals, electrical signals in response to light signals, or both, and therefore may be termed the "active" portion of the optical array module 40. These transducers and their ancillary equipment, if any, are the sources of the heat which heat sink 43 sinks. Also illustrated in FIG. 1a is a keying pin 23k1 which is fitted to active portion 44, for fitting into keying aperture 22k1 of ferrule 20 for accurately aligning the ferrule 20 with the active portion 44. In accordance with standards for the MT ferrule, the keying pins have diameters of 0.698 mm, and are spaced apart by 4.6 mm. Portion 44 of optical array module 40 may also include additional portions, illustrated as 50, which project beyond an aperture 15a in enclosure wall 15. It should be noted that some or all of block 44 may project through aperture 15a.

FIG. 1b illustrates a portion of a twelve-optical-fiber ribbon cable 16, placed between an upper ferrule portion 22u and a lower ferrule portion 22l. Upper and lower ferrule portions 22u and 22l include facing surfaces which are bonded together when the ferrule is completed. In FIG. 1b, the lower mating surface is designated $22l_{ls}$. Each of the upper and lower mating surfaces includes one-half of keying apertures 22k1 and 22k2 so that, when the two halves are mated, the complete keying apertures are defined. The upper and lower mating surfaces include twelve closely spaced, mutually parallel, vee-block type depressions. The upper set of twelve vee-block type depressions is designated $22u_{vb}$, and the lower set of twelve vee-block type depressions is designated $22l_{vb}$. The spacing between the mutually parallel vee-block type depressions of both the upper or lower sets $22u_{vb}$ and $22l_{vb}$ equals the spacing between optical fibers of ribbon 16, so that the ribbon can fit into the vee-block depression sets and be captured therebetween. The vee-block depression sets $22u_{vb}$ and $22l_{vb}$ and the keying apertures $22k1$ and $22k2$ are held to tight tolerances, so that the ends of the optical fibers bear a known dimensional relationship to each other and to the keying apertures. In the fabrication of the ferrules, the ends of the individual optical fibers of ribbon 16 are made coincident with a planar surface defined by surface $20us$ of upper ferrule portion $22u$ and surface $20ls$ of lower ferrule portion $22l$. The resulting planar surface $20us/20ls$ may be polished or lapped to ensure flatness and coincidence of the ends of the optical fibers with the resulting planar surface $20us/20ls$. It should be understood that the description of the ferrule in conjunction with FIG. 1b is solely to provide understanding of the resulting structure, and not to define a method of manufacture. It should also be understood that the number of optical fibers associated with a given ferrule 20 may be other than twelve.

Figure 2:
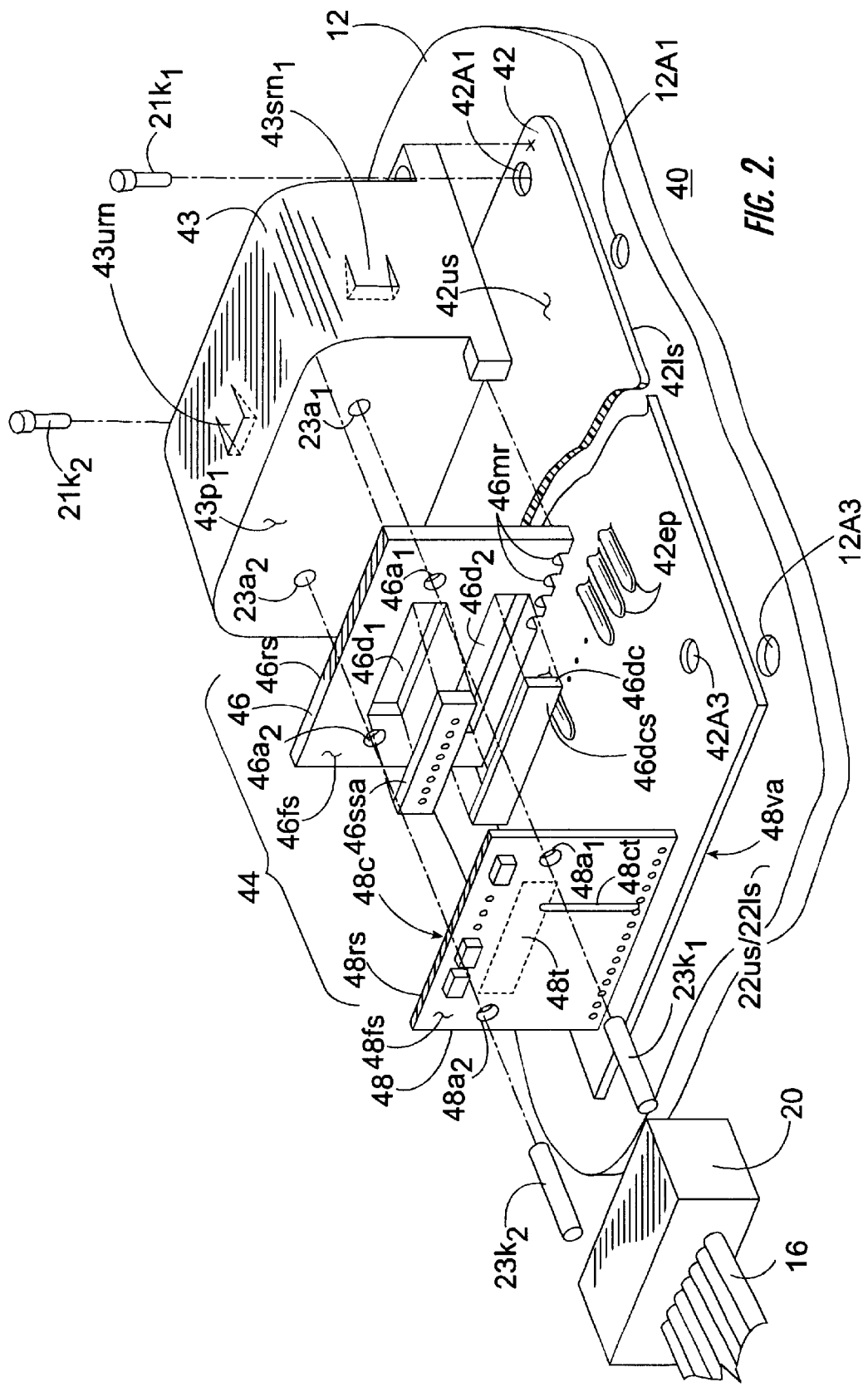
FIG. 2 is a simplified, exploded view of a portion of a modular optoelectric module according to an aspect of the invention.

Elements of FIG. 2 corresponding to those of FIG. 1a are designated by like reference numerals. In FIG. 2, heat sink 43 can be seen to include a planar surface $43p1$ with a pair of apertures $23a1$ and $23a2$ spaced apart by about 4.6 mm and dimensioned to clear keying pins $23k1$ and $23k2$. These holes are for providing substantial clearance for the keying pins $23k1$ and $23k2$, respectively, used for keying the MT ferrule 20. Apertures $23a1$ and $23a2$ have a diameter larger than the 0.698 mm diameter of the associated keying pins $23k1$ and $23k2$, so that the keying pins can be held in place by a suitable adhesive, such as epoxy resin, after being precisely located or set to engage the ferrule 20.

Active portion 44 of the structure of FIG. 2 includes a planar, insulating high-density-interconnect (HDI) heat-spreading substrate 46, defining a flat front surface $46fs$ and a flat rear surface $46rs$. In most cases, the HDI substrate 46 will be rendered surface conducting over large portions of its surface to provide ground reference. Rear surface $46rs$ of substrate 46 is also flat, and bears against planar surface $43p1$ of heat sink 43 for heat transfer thereto. A pair of clearance through apertures $46a1$ and $46a2$ are dimensioned commensurately with apertures $23a1$ and $23a2$, respectively, and are aligned therewith when substrate 46 is affixed to heat sink 43. Planar substrate 46 also defines at least one depression or sunken portion $46d1$ dimensioned to accommodate the full depth of a solid-state optoelectric chip or packaged chip $46ssa$. Optoelectric chip $46ssa$ fits into depression $46d1$, with its optical transfer surface flush or coplanar with front surface $46fs$ of substrate 46, to the extent required for HDI connections. The solid-state optoelectric chip $46ssa$ may include an array of light sources such as lasers, or it may include an array of light-to-electric converters such as detector diodes, or it may include both light sources and light-to-electric converters.

Figure 5:
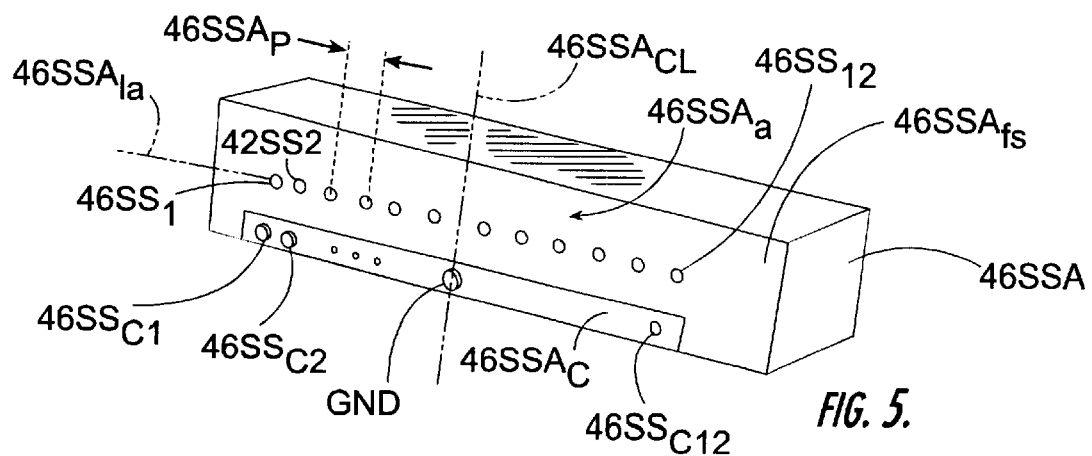
FIG. 5 is a simplified perspective or isometric illustration of a solid-state optoelectric module which may be used in the arrangement of FIG. 2.

FIG. 5 is a simplified perspective or isometric view of a solid state chip or integrated circuit $46ssa$. As illustrated in FIG. 5, the chip has a planar front or active surface $46ssa_{fs}$. A line array of optical ports $46ss_1$, $46ss_2$, ..., $46ss_{12}$ of twelve optoelectric converters is designated $46ssa_a$, and six of the ports lie on each side of an array centerline $46ssa_{cl}$. The pitch or distance between an optical port and the next adjacent optical port is 0.25 mm. The optoelectric transducers associated with the optical ports of array $46ssa_a$ are internally connected to appropriate surface connections $46ss_{c1}$, $46ss_{c2}$, ..., $46ss_{c12}$ lying in region $46ssa_c$ on front surface $46ssa_{fs}$. Each optoelectric transducer associated with an optical port $46ss_1$, $46ss_2$, ..., $46ss_{12}$ is connected individually to a corresponding one of the surface connections $46ss_{c1}$, $46ss_{c2}$, ..., $46ss_{c12}$, so that each transducer may be individually addressed. As known to those skilled in the art, at least one additional electrical connection is needed to provide the individual addressing, and such an additional connection is ordinarily a common or ground (GND). It should be understood that the second electrical connection can be individualized (not common) and brought individually to each transducer. The connections are brought to front surface $46ssafs$ of FIG. 5 for surface connection.

In addition to depression $46d1$, substrate 46 of FIG. 2 may define other depressions for accommodating other solid-state devices or electrical components. For example, a further rectangular depression $46d2$ is provided, dimensioned to accommodate a solid-state driver chip for driving a laser array, or a solid-state low-noise amplifier chip for driving external signal paths from light-to-electric converter elements. Such a solid-state chip is designated as $46dc$ in FIG. 2. Substrate 46 further includes a plurality of metallized or electrically conductive regions lying along its bottom edge, some of which are designated $46mr$, which are provided to allow electrical connections to be made from the substrate 46 to off-substrate electrical sources or sinks.

Interconnection among the various solid-state electrical chips and components which may be located in depressions in the front surface $46fs$ of substrate 46 of FIG. 2 is provided by an HDI flexible interconnect film 48 of active portion 44 of optical array module 40, which flexible interconnect may, as known, include one or more layers of KAPTON or other suitable material, printed with various patterns of electrical conductors and electrically conductive through vias. Interconnect film 48 defines a front or obverse surface $48fs$ and an reverse surface $48rs$. At least a region $48t$ of interconnect film 48 is maintained transparent, as by routing electrical conductors around the region, or by using electrical conductors which are transparent, either due to the nature of the conductive material, its thickness, or both. This transparent region $48t$ is registered with the active optoelectronic or optoelectric element array of the solid state array $46ssa$, so that light can be transmitted through the interconnect film to or from the array. As illustrated in FIG. 2, interconnect film 48 defines a pair of through apertures $48a1$ and $48a2$, each of which is dimensioned to closely fit around a 0.698 mm diameter keying pin. These through apertures $48a1$ and $48a2$ are on 4.6 mm centers, so that they closely correspond with the standards for MT ferrule 20 and keying pins $23k1$ and $23k2$, and consequently align with larger apertures $46a1$ and $46a2$. According to a particular aspect of the invention, the apertures $48a1$ and $48a2$ are defined in interconnect film 48 in conjunction with HDI operations, which include precise laser operations including the drilling of inter-layer vias which are ultimately rendered conductive. In FIG. 2, a plurality of vias are illustrated as an array $48va$. These vias extend through the various layers of the HDI interconnect film 48, making electrical contact with so many of the electrical conductors as may be desired at each layer, and ultimately providing an electrically conductive contact pad or surface on the reverse side $48rs$. These electrical connection vias on the 10 reverse side $48rs$ of interconnect film 48 make contact with the various metallizations $46mr$ on substrate 46 when interconnect film 48 is in place over the front surface $46fs$ of substrate 46. Thus, interconnect film 48 provides electrical connections $48ct$ among the various solid-state devices or chips mounted in the depressions in substrate 46, and also provides electrical connections, by way of connections such as $48ct$, vias $48va$ and electrical conductors of set $46mr$, to external circuits.

In addition to providing electrical interconnections among the various solid-state chips, other electrical components may be surface-mounted on interconnect film 48. As illustrated by blocks in FIG. 2, a plurality of filter capacitors are designated jointly as 48c. In a particular embodiment of the invention where the solid-state array 46ssa is an array of twelve lasers, there are a plurality of chip resistors in set 48c, which condition or set the applied laser bias power to achieve the desired performance levels.

A ferrule 20 is illustrated in FIG. 2 as being mounted with its polished or lapped surface 22us/22ls abutting transparent region 48t of interconnect film 48, with one end of keying pins 23k1 and 23k2 set to engage the apertures 48a1 and 48a2 of interconnect film 48, and with the other ends of keying pins 23k1 and 23k2 set to engage the keying apertures 22k1 and 22k2 (FIGS. 1a and 1b) of the ferrule 20. With alignment of the ferrule relative to the HDI interconnect film guaranteed by the keying pins, and with the location of the solid-state array 46ssa relative to the interconnect film guaranteed by the HDI operations which make the via interconnections, the alignment of the twelve optical fibers of the ribbon cable 16 to the optoelectric ports $46ss_1$, $46ss_2$, . . . , $46ss_{12}$ of the solid-state array 46ssa is guaranteed.

Figure 3:
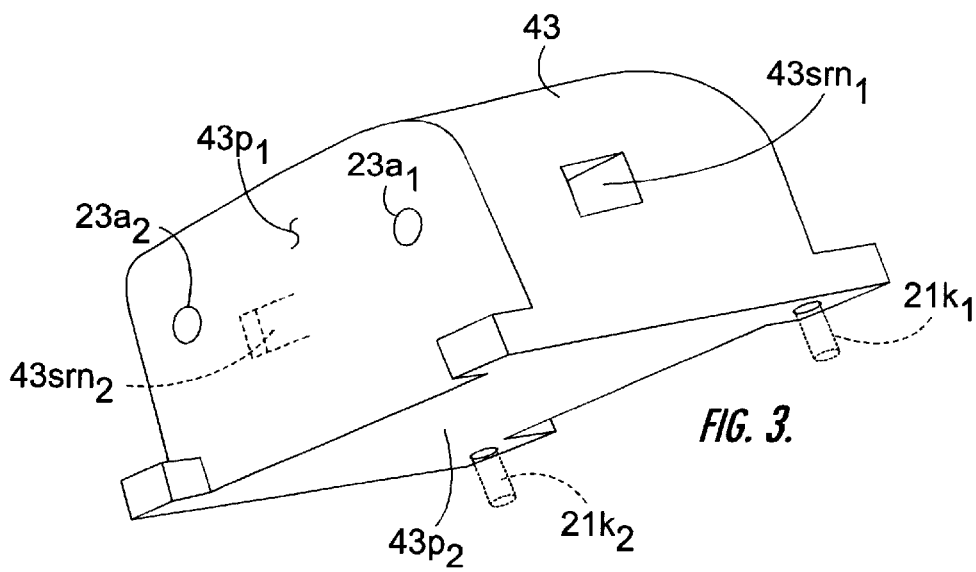
FIG. 3 is a simplified perspective or isometric view of the heat sink of FIG. 1, showing a planar lower surface.

FIG. 3 is a simplified perspective or isometric view of heat sink 43, illustrating a planar lower surface 43p2 which is ideally orthogonal to planar surface 43p1 in one embodiment of the invention.

Figure 4:
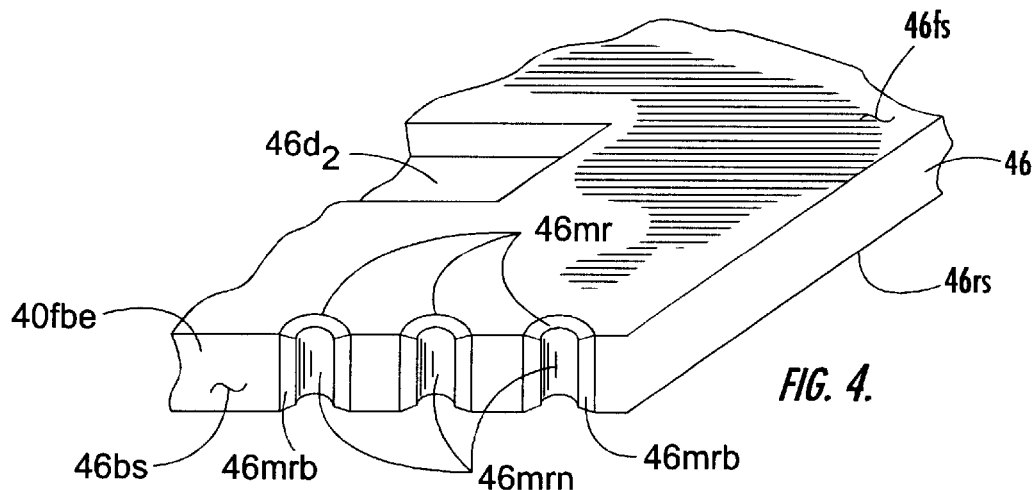
FIG. 4 is a simplified perspective or isometric view of a lower portion of the HDI substrate of FIG. 1, showing details of the metallizations.

FIG. 4 is a simplified perspective or isometric view of a lower edge portion of HDI substrate 46, illustrating a portion of depression 46d2, and also illustrating some details of metallizations or electrical connections 46mr. As illustrated in FIG. 4, each metallization region 46mr extends from front surface 46fs over a "sharp" front-to-bottom surface edge 46fbe onto a bottom surface 46bs, at which location the metallization is designated 46mrb. In order to avoid the possibility that breaking of the metallization extending over edge 46fbe would actually result in loss of electrical connection between metallization portion 46mr on front surface 46fs and metallization portion 46mrb on bottom surface 46bs, each metallization is made at the location of a notch or depression 46mrn, and the metallization extends into the various notches. Consequently, an inadvertent scratch or swipe across the edge may damage the portion of the metallization which actually goes over the edge 46fbe, but the electrical connection is maintained intact by the continuous metallization which extends, undamaged, from front surface 46fs, into notch 46mrn, and thence over that portion 46mrb of metallization 46mr which lies on bottom surface 46bs adjacent any notch 46mrn.

In FIG. 2, the heat sink 43, substrate 46 with its solid-state chips, and HDI interconnect film 48 are illustrated as exploded away from each other, but it will be understood that when assembled, they form a compact unit. This compact unit is intended to be assembled to a printed-circuit board, such as board 12. A further intermediate interconnection board 42 lies under the compact assemblage of heat sink 43, substrate 46 with its components, and interconnect film 48. The upper surface 42us of this intermediate interconnection board is bonded to the lower or underside planar surface 43p2 of heat sink 43 to provide a low-thermal-resistance path to the intermediate interconnection board 42. The upper surface 42us of intermediate interconnection board 42 bears electrically conductive pads or conductive paths, some of which are illustrated as 42ep, located so as to make connection with the metallizations 46mrb extending onto bottom surface 46bs of HDI substrate 46. In general, electrical paths 42ep on the upper surface 42us of board 42 should not be allowed to come into electrical contact with the lower surface 43p2 of heat sink 43, as the heat sink is likely to be made from electrically conductive material, which would short-circuit the electrical paths 42ep. Instead of providing separate electrical insulation, board 42 is desirably in the form of a multilayer board, in which a dielectric layer of the board provides the desired electrical isolation. The use of a multilayer board also permits the electrical signal paths to be in the form of stripline or microstrip transmission paths, which as known to those skilled in the art are very desirable for transmission of electrical signals having wide bandwidth. Since one of the reasons for going from electrical transmission to optical transmission is to obtain wide bandwidth, it can be expected that the signals being coupled to and from the optoelectric element array 46ssa will have a substantial bandwidth. Consequently, transmission-line structures are desired. Thus, making intermediate interconnection board 42 with multiple layers allows the use of individual layers for ground "planes" associated with the transmission lines.

Figure 6:
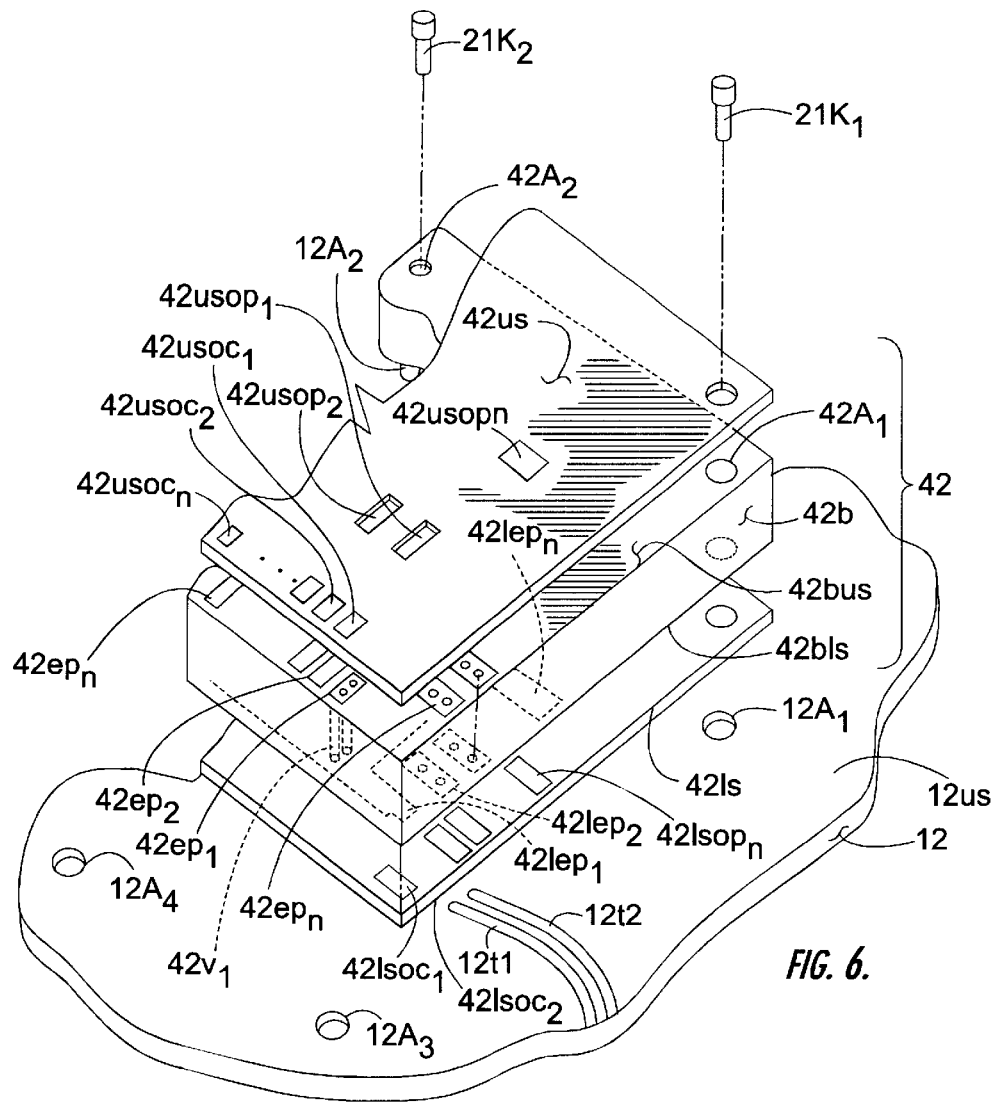
FIG. 6 is a simplified exploded view of a portion of an intermediate interconnection board 42 according to an aspect of the invention, showing various layers, and also showing a keying aperture.

FIG. 6 is a simplified exploded view of a portion of an intermediate interconnection board 42 according to an aspect of the invention, showing various layers, and also showing a keying aperture. In FIG. 6, an upper layer 42us, ordinarily referred to as a coverlay or solder mask, is attached to upper surface 42bus of circuit board 42b. A lower coverlay or solder mask 42ls is attached to a lower surface 42bls of circuit board 42b. Upper coverlay 42us defines exemplary apertures 42usoc1, 42usoc2, . . ., 42usocn, 42usop1, 42usop2, . . . , 42uspn, which provide access for solder flow to metallized circuit board traces on the upper surface 42bus of circuit board 42b. Similarly, lower coverlay or solder mask 42ls defines apertures 42lsoc1, 42lsoc2, . . . , 42lsocn, which provide solder access to metallizations on the lower surface 42bls of circuit board 42b. Circuit board 42b may also define features including other conductive circuit traces, such as 42ep1, 42ep2, . . . , 42epn on the upper surface 42bus, circuit traces 42lep1, 42lep2 on the lower surface 42bls (andor in other, internal layers of the circuit board 42b, which are not illustrated in FIG. 6), conductive or metallized through vias such as 42v1 connecting some metallized traces on upper surface 42bus to some of the circuit traces on lower surface 42bls, and may also include a keying aperture illustrated as 42a1. Ultimately, the electrical connections to or from the solid state array 46ssa (FIGS. 2, 5), by way of driver 46dc if appropriate, arrive at electrical terminations 42ep1, 42ep2, . . . , 42epn on the upper surface 42us of intermediate interconnection board 42, and are coupled through intermediate interconnection board 42 to the electrical connections such as 42lep1, 42lep2 on the lower surface 42bls.

Pins 21k1 and 21k2 of FIG. 6 engage keying apertures 42a1 and 42a2, respectively, on circuit board 42b, and keying apertures 12A1 and 12A2, respectively, on circuit board 12, to thereby guarantee circuit trace alignment or registry between intermediate circuit board 42 and printed circuit board 12. Naturally, for this registration to exist, the patterns of metallization must have corresponding elements in like locations relative to the keying apertures. Additional registration apertures may be provided; some additional apertures are illustrated in FIG. 6 as 12A3 and 12A4, and a registration aperture corresponding to 12A3 is illustrated in FIG. 2 as 42A3. Instead of being separate pins, the keying pins 21k1 and 21k2 (and any other corresponding pins, not illustrated) may be cast or fabricated integral with the heat sink 43.

Connections are easily made, as by solder reflow, between electrical terminations 42lep1, 42lep2, . . . , 42lepn on the lower surface 42*bls* of intermediate connection board 42 of FIG. 6 and corresponding metallizations, such as metallizations 12*t*1 and 12*t*2, of pattern 12*t* lying on upper surface 12*us* of underlying printed-circuit board 12. It should be noted that the "n" designation or suffix is an indication of the last among the elements, rather than an indication of number. Consequently, the use of the suffix "n" should not be interpreted to refer to any specific number of elements in the set unless the context demands such a numerical interpretation.

Thus, the structure described in conjunction with FIGS. 1 through 6 provides a convenient way to provide coupling between optical signals in a ribbon cable associated with an MT ferrule and a printed circuit board 12. It provides the advantages of simple fabrication by methods including the reliable HDI techniques, jig fixturing, epoxy curing, and solder reflow.

As so far described, the MT ferrule 20 can be coupled to the transparent region 48*t* of HDI interconnection film 48. However, no structure is provided for retaining the MT ferrule in place. According to another aspect of the invention, the optical array module 40 is provided with modular connection adapters, illustrated generically as 50 in FIG. 1, So that any of the various types of "connectors" which use MT ferrules can be coupled to the optical array module 40. Referring once again to FIGS. 2 and 3, it can be seen that the outer surface of heat sink 43 bears an upper retention notch or depression 43*urn* and a first side retention notch or depression 43*srn*1. A second side retention notch, designated 43*srn*2, lies on that side of heat sink 43 which is opposed to the side on which retention notch 43*srn*1 resides, and is illustrated in phantom in FIG. 3. These retention notches are ramp-shaped, and provide purchase (a grip) for holders associated with the various MT ferrule connector adapters 50, and also provide keying which brings the ferrule of the associated connector into sufficient registry to allow the keying pins 23*k*1 and 23*k*2 of FIG. 2 to engage the keying apertures 22*k*1 and 22*k*2 of the associated MT ferrule, and thereby allow proper optical coupling between the MT ferrule and the array of optoelectric ports of solid state optoelectric chip 46*ssa*.

FIG. 7*a* is a simplified perspective or isometric view, partially cut away to reveal interior details, of a connector adapter 50 from the structure of FIG. 1 to be compatible with an MPO connector per IEC standard 61754-7 or MTP connector per IEC 1754-7. That is, the structure of the arrangement of FIG. 7*a* is compatible with both the MPO and MTP connectors. These connectors are simple structures which hold an MT ferrule for coupling to another MT ferrule, and provide for captivating the MT ferrule in mating relationship. As illustrated in FIG. 7*a*, adapter 710 includes a body 712 defining a proximal end 714 and a distal end 716. The distal end 716 of adapter 710 defines an aperture 730 dimensioned to clear the MT ferrule and other portions of a MPO or MTP connector which may be inserted thereinto. As illustrated in FIG. 7*a*, the side walls of aperture 730 define a central keying slot, notch or dado 732 and a pair of side rails, designated as 731*a* and 731*b*. Details of the ends of side rails 731*a* and 731*b* can be found in FIG. 7*c*. When an MPO or MTP connector with its MT ferrule is inserted into aperture 730 of adapter 710 of FIG. 7*a*, the MT ferrule extends thereinto, but is prevented from being removed by catches or ramp-shaped bosses formed on the ends of siderails 731*a* and 731*b*.

The proximal end 714 of adapter 710 of FIG. 7*a* includes side walls 713 which define a cavity 720 dimensioned to fit over the exterior of heat sink 43. The interior walls of cavity 720 define a plurality of protruding ramp-shaped bosses, two of which are illustrated in FIG. 7*a*. The first ramp-shaped side boss is designated 73*srn*1, and is dimensioned to fit within side ramp-shaped purchase depression 43*srn*1 of FIG. 3. Another corresponding ramp-shaped side boss is not illustrated in FIG. 7*a*, but is dimensioned to fit within ramp-shaped purchase depression 43*srn*2 of FIG. 3. An upper ramp-shaped boss is designated as 73*urn*, and is dimensioned to fit within upper ramp-shaped purchase depression 43*urn* of FIG. 2. The body 712 of adapter 710 of FIG. 7*a* is made from an elastomer, and the walls 713 are somewhat springy, so that the proximal end of the adapter 710 can be pressed onto the heat sink 43, tensioning the walls so that when the ramp-shaped bosses register with the purchase depressions, they snap into place. When snapped into place, a tension remains which tends to cause the ramp-shaped bosses to ride down into the ramp-shaped purchase depressions, and this tends to draw the adapter closer to the heat sink. At some point, the keying apertures 22*k*1 and 22*k*2 (FIG. 1*a*) of the MT ferrule 22 of the MPO or MTP connector fitted into aperture 730 of adapter 710 of FIG. 7*a* will be drawn onto the tapered ends of the keying pins 23*k*1 and 23*k*2, respectively, so that the MT ferrule will be keyed. The drawing continues until the lapped or planar face 20*us*/20*ls* of the MT ferrule is drawn into close contact with transparent region 48*t* of HDI flexible interconnect film 48 of FIG. 2. When in close contact, the desired optical coupling is accomplished. The catchment portions 731*a* and 731*b* of the adapter 710 prevent removal of the MPO or MTP connector, at least up to the yield strength of the catchment.

FIG. 7*b* is a simplified perspective or isometric view of a variant 750 of the arrangement of the adapter 710 of FIG. 7*a*. The only difference between the arrangement of the adapter of FIG. 7*b* and that of FIG. 7*a* is that the keying slot or dado 732 is on the upper side of the aperture 730, rather than on the lower side. This has the effect of reversing the array direction of the optical fibers of the MT ferrule of the connector relative to the optical ports $46ss_1, \ldots, 46ss_2, \ldots, 46ss_{12}$ of FIG. 5.

Figures 8A, 8C:
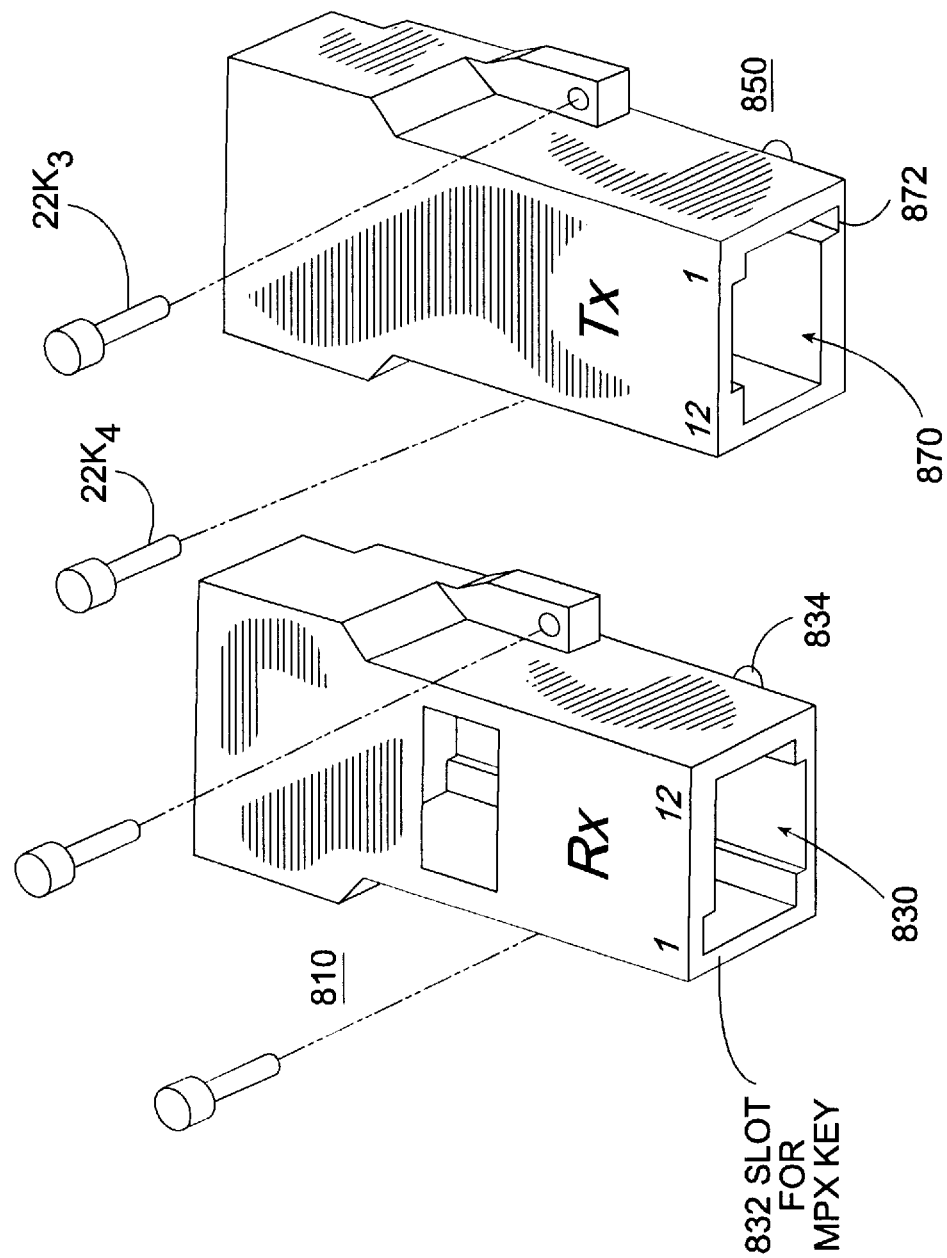
FIGS. 8a and 8b are simplified upper and lower perspective or isometric views of a receiver (RX) version of an adapter for use with an MPX optical connector.
FIG. 8c is a simplified upper perspective or isometric view of a transmitter (TX) version of an adapter useful with MPX connectors.
Figure 8B:
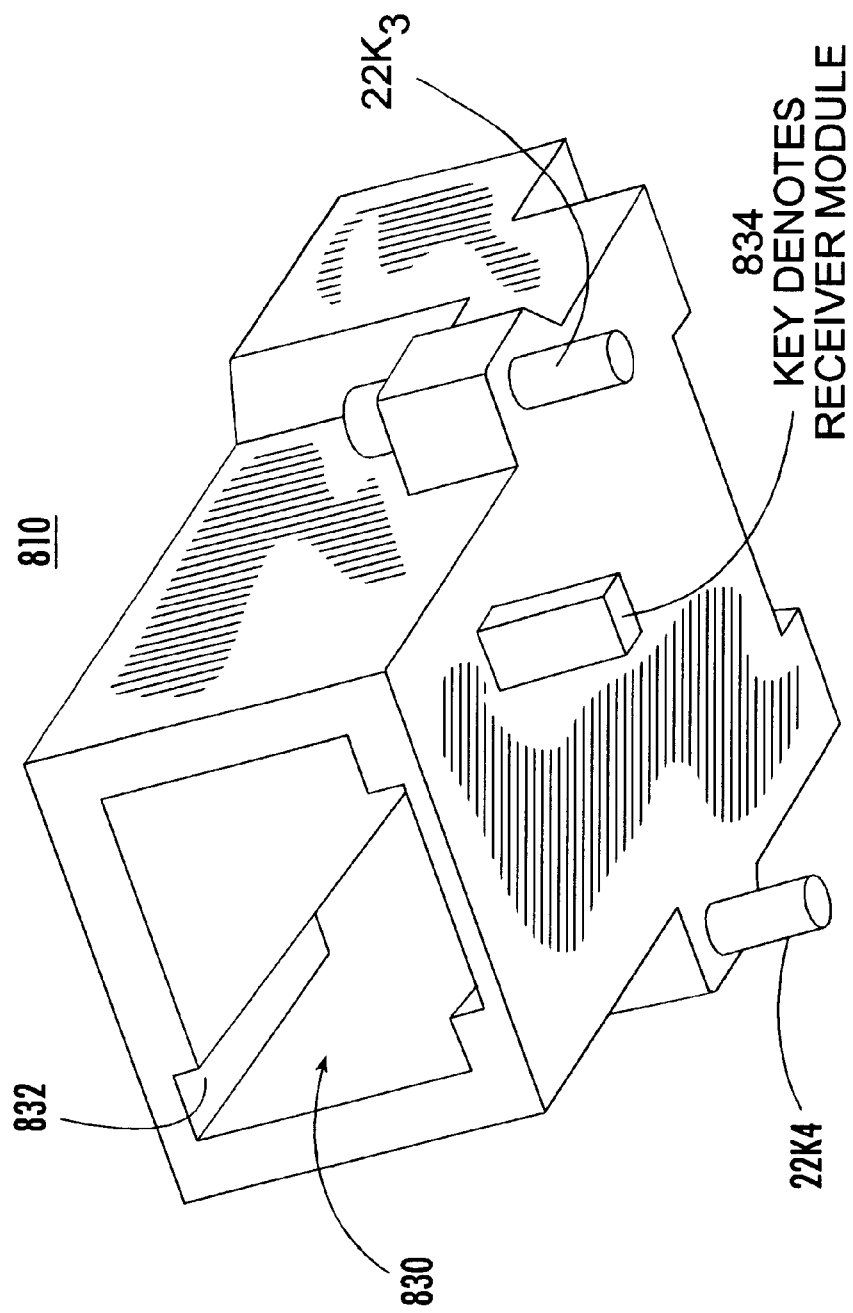
Figure 8D:
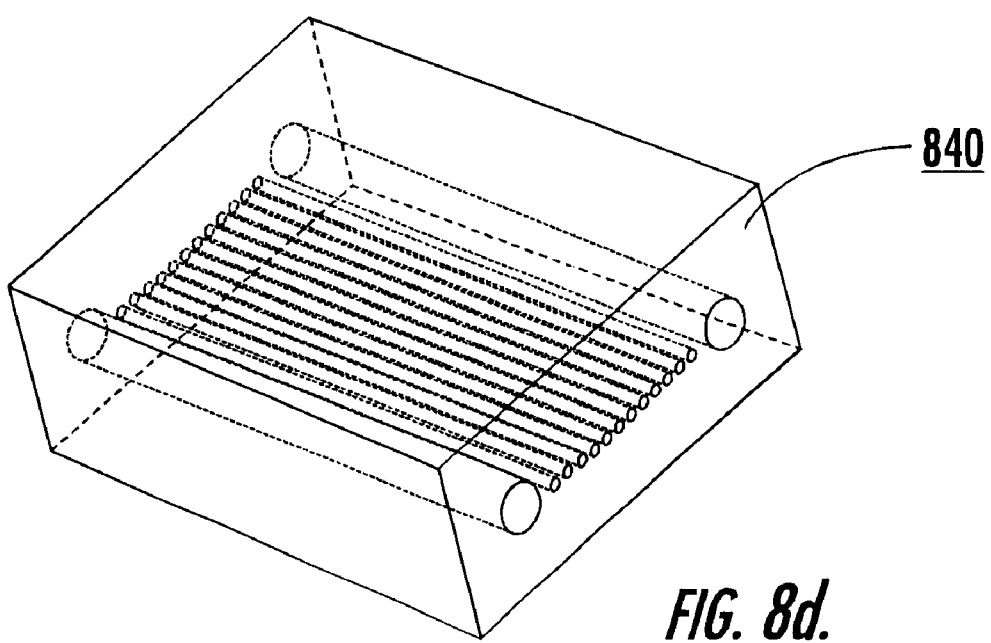
FIG. 8d is a simplified perspective or isometric view of an MT ferrule extension useful with MPX connectors.

FIGS. 8*a* and 8*b* are simplified upper and lower perspective or isometric views of a receiver (RX) version of an adapter for use with an MPX optical connector, and FIG. 8*c* is a simplified upper perspective or isometric view of a transmitter (TX) version of an adapter useful with MPX connectors. The RX version of FIGS. 8*a* and 8*b* is designated generally as 810, and the TX version of FIG. 8*c* is designated as 850. The MPX connectors also use MT ferrules internally, and the same considerations apply to the MPX connector adapters 810 and 850 as to the connector adapters 710, 750 described in conjunction with FIGS. 7*a* and 7*b*, except that an additional MT ferrule extension, illustrated as 840 in FIG. 8*d*, is included in-line physically (and optically) between the MPX connector MT ferrule and the transparent region 48*t* of HDI flexible interconnect film 48 of FIG. 2. As illustrated in FIGS. 8*a* and 8*b*, the connector-receiving aperture of adapter 810 is designated 830, and it includes a keying slot 832 located at one side of the aperture. The RX key denoter 834 on the lower surface of the body is located to the right of the centerline of connector receiving aperture 830. The key denoter 834 appears only in the RX version of the adapter 810, and is not found on the TX adapter 850. TX adapter 850 of FIG. 8*c* includes a similar connector-accepting aperture 870, with keying slot 872 and TX key denoter (not illustrated) which is located to the left of the centerline of the aperture. It should be noted that adhesive may be used to the optical fiber ribbon 16 and MT ferrule 20 in close contact to the transparent region 48t of HDI flexible interconnect film 48 of FIG. 2. Thus, the item designated 50 in FIG. 1a may be a simple cast or molded strain relief boot.

According to another aspect of the invention, surface 43p1 of FIG. 3 may be set to an angle relative to surface 43p2 which is not exactly 90°, to tailor the optical properties of light moving between ferrule 20 of FIG. 2, transparent region 48t, and the array of optical ports of solid-state optoelectronic chip 46SSA.

Other embodiments of the invention will be apparent to those skilled in the art. For example, the drivers may provide either analog or digital processing. If digital signal is carried, the signal may be in parallel or serial form. Transparent region 48t of FIG. 2 may provide desirable optical properties used to condition the light traversing the transparent region between surfaces 48rs and 48fs. Optical properties which may be conditioned include attenuation, polarization status discrimination, and numerical aperture. Conditioning of the optical properties of transparent region 48t may enhance performance of optical array module 40, particularly in regard to such factors as human eye safety and digital light signaling contrast ratio.

Thus, according to an aspect of the invention, a modular transducer (40) is intended for mounting onto an underlying printed-circuit board (12), for transducing between optical signals propagating through an MT ferrule (20) and electrical signals. The modular transducer (40) comprises an optoelectric transducer solid-state device or integrated circuit (46ssa) including a planar optical interface surface (46ssa$_{fs}$) and a plurality of optoelectric transducer elements arranged in a line array (46ssa$_a$) along an array axis (46ssa$_{1a}$) with a pitch of 0.250 mm. The optoelectric transducer integrated circuit (46ssa) also includes at least one individual electrical connection (46ss$_{c1}$, 46ss$_{c2}$, . . . ,46ss$_{c12}$) for each of the optoelectric transducer elements and one electrical connection common (GND) to all of the optoelectric transducer elements. At least the one individual electrical connection (46ss$_{c1}$, 46ss$_{c2}$, . . . ,46ss$_{c12}$) for each of the optoelectric transducer elements is located on the planar optical interface surface (46ssa$_{fs}$). A heat spreading substrate (46) which at least thermally conductive is included. The heat spreading substrate (46) defines a front surface (46fs), which defines a planar portion and at least one depressed portion (46d1) in which the optoelectric transducer integrated circuit (46ssa) lies, with the planar portion of the front surface (46fs) of the heat spreading substrate (46) substantially coplanar with the planar optical interface surface (46ssa$_{fs}$). The heat spreading substrate (46) also defines a rear surface (46rs) substantially parallel with the planar portion of the front surface (46fs). A transparent (48t) film (48) extends over the planar optical interface circuit (46ssa) and at least a portion of the front surface (46fs) of the heat spreading substrate (46). The transparent film (48) bears electrically conductive circuit traces (48ct) connected to the electrical connections of the optoelectric transducer elements. First (23k1) and second (23k2) alignment pins having diameters of 0.698 mm extend substantially perpendicularly from the planar portion of the front surface (46fs) of the heat spreading substrate (46) at locations lying substantially on the array axis (46ssa$_{1a}$) at distances of 2.3 mm from the center (46ssa$_{CL}$) of the line array (46ssa$_a$). The alignment pins (23k1, 23k2) extend through the transparent film (48) if the transparent film (48) overlies the pin (23k1, 23k2) locations. A heat sink (43) includes substantially mutually orthogonal first (43p1) and second (43p2) planar surfaces. At least a portion of the first planar surface (43p1) of the heat sink (43) is thermally coupled to the rear surface (46rs) of the heat spreading substrate (46) for heat transfer therebetween. An interface printed circuit (42) includes a dielectric sheet defining first (42us) and second (42ls) broad surfaces, and possibly other interior surfaces. The dielectric sheet (42) is physically supported, at least in part, by the second surface (43p2) of the heat sink (43). The interface printed circuit further (42) includes electrically conductive circuit traces (42ep1, 42ep2, . . . , 42epn) having electrical contact or coupling (by way of traces 46mr of substrate 46 of FIG. 4) to at least some of the electrically conductive traces (such as 48ct) borne by the transparent film (48). The interface printed circuit (42) further includes electrically conductive bond pads (42lep1, 42lep2, . . . , 42lepn) which are adaptable or available for connection to at least some of the electrically conductive traces (12t1, 12t2) of the underlying printed circuit board (12). The electrically conductive bond pads (42lep1, 42lep2, . . . , 42lepn) are generally planar connecting or connectable (by solder, for example) surfaces physically supported by the interface printed circuit dielectric sheet (42b). The electrically conductive bond pads (42lep1, 42lep2, . . . , 42lepn) are accessible on the second or lower broad surface (42ls) of the interface dielectric sheet (42).

In one embodiment of the invention, the modular transducer (40) further includes a protruding connection element (21k1, 21k2) projecting from the second side (42ls) of the dielectric sheet (42), for engaging with a corresponding aperture (12A1, 12A2) of the underlying printed circuit board (12) for at least registering the bond pads (42lep1, 42lep2, . . . , 42lepn) with corresponding pads (such as 12t1, 12t2) of the underlying printed circuit board (12).

In another avatar of the invention, the modular transducer (40) further comprises an optoelectric driver integrated circuit (46dc) including an electrical connection surface (46dcs), the optoelectric driver integrated circuit (46dc) being supported by the heat spreading substrate (46d2) with the electrical connection surface (46dcs) coplanar with the planar portion of the front surface (46fs) of the heat spreading substrate (46). At least some electrical connections of the electrical connection surface (46dcs) of the optoelectric driver integrated circuit (46dc) are electrically connected (by traces of HDI film 48) to electrically conductive traces borne by the transparent (HDI) film.

In a particularly advantageous manifestation of the invention, the modular transducer (40) further includes an optical snout or adapter (710, 750, 810, 850) capable of accepting one of MTP, MPO, and MPX connector interfaces containing a MT ferrule (20), and optically mating the MT ferrule (20) to the optoelectric transducer integrated circuit (46ssa) when the registration apertures of the MT ferrule (20) are mated to the first (23k1) and second (23k2) alignment pins.

What is claimed is:

1. A modular transducer adaptable for mounting onto an underlying printed-circuit board for transducing between optical signals propagating through an MT ferrule and electrical signals, said modular transducer comprising:

an optoelectric transducer integrated circuit including a planar optical interface surface and a plurality of optoelectric transducer element ports arranged in a line array along an array axis with a pitch of 0.250 mm, said optoelectric transducer integrated circuit also including at least one individual electrical connection for each of said optoelectric transducer elements and one electrical connection common to all of said optoelectric transducer elements, at least said one individual electrical connection for each of said optoelectric transducer elements being located on said planar optical interface surface;

a heat spreading substrate which is both thermally and electrically conductive, said heat spreading substrate defining a front surface, which front surface defines a planar portion and at least one depressed portion in which said optoelectric transducer integrated circuit lies with said planar portion of said front surface of said heat spreading substrate substantially coplanar with said planar optical interface surface, said heat spreading substrate also defining a rear surface substantially parallel with said planar portion of said front surface;

a transparent film extending over said planar optical interface circuit and at least a portion of said front surface of said heat spreading substrate, said transparent film bearing electrically conductive traces connected to said electrical connections of said optoelectric transducer elements;

first and second alignment pins having diameters of 0.698 mm extending substantially perpendicularly from said planar portion of said front surface of said heat spreading substrate at locations lying substantially on said array axis at distances of 2.3 mm from the center of said line array, said alignment pins extending through said transparent film if said transparent film overlies said locations;

a heat sink including substantially mutually orthogonal first and second planar surfaces, at least a portion of said first planar surface of said heat sink being thermally coupled to said rear surface of said heat spreading substrate for heat transfer therebetween;

an interface printed circuit including a dielectric sheet defining first and second broad surfaces, said dielectric sheet being physically supported, at least in part, by said second surface of said heat sink, said interface printed circuit further including electrically conductive circuit traces making electrical connection to at least some of said electrically conductive traces borne by said transparent film, said interface printed circuit further including electrically conductive bond pads adaptable for connection to at least some electrically conductive traces of said underlying printed circuit, said electrically conductive bond pads being generally planar connecting surfaces physically supported by said dielectric sheet of said interface printed circuit, said electrically conductive bond pads being accessible on said second side of said dielectric sheet.

2. A modular transducer according to claim 1, further comprising a protruding element projecting from said second side of said dielectric sheet, for engaging with a corresponding aperture of said underlying printed circuit for at least registering said bond pads with corresponding pads of said underlying printed circuit board.

3. A modular transducer according to claim 1, further comprising an optoelectric driver integrated circuit including an electrical connection surface, said optoelectric driver integrated circuit being supported by said heat spreading substrate with said electrical connection surface coplanar with said planar portion of said front surface of said heat spreading substrate, at least some electrical connections of said electrical connection surface being electrically connected to electrically conductive traces borne by said transparent film.

4. A modular transducer according to claim 1, further comprising an optical snout capable of accepting one of MTP, MPO, and MPX connector interfaces containing a MT ferrule, and for mating said MT ferrule to said optoelectric transducer integrated circuit when the registration apertures of said MT ferrule are mated to said first and second alignment pins.

* * * * *